US008833648B1

(12) United States Patent
Medina, III et al.

(10) Patent No.: US 8,833,648 B1
(45) Date of Patent: *Sep. 16, 2014

(54) DYNAMIC CREDIT CARD SECURITY CODE VIA MOBILE DEVICE

(71) Applicant: United Services Automobile Association (USAA), San Antonio, TX (US)

(72) Inventors: Reynaldo Medina, III, San Antonio, TX (US); Bradly J. Billman, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/759,470

(22) Filed: Feb. 5, 2013

Related U.S. Application Data

(63) Continuation of application No. 12/101,881, filed on Apr. 11, 2008, now Pat. No. 8,365,988.

(51) Int. Cl.
- G06K 5/00 (2006.01)
- G06K 7/08 (2006.01)
- G06Q 20/32 (2012.01)

(52) U.S. Cl.
CPC .................................. G06Q 20/3226 (2013.01)
USPC ........... 235/380; 235/382; 235/449; 235/451; 235/492; 235/493

(58) Field of Classification Search
USPC ...................... 235/375, 382.5, 451, 487, 492, 235/380–383, 449, 493
See application file for complete search history.

(56) References Cited

U.S. PATENT DOCUMENTS

| | | | |
|---|---|---|---|
| 6,293,462 B1 | 9/2001 | Gangi | |
| 6,715,679 B1 | 4/2004 | Infosino | |
| 6,898,421 B2 | 5/2005 | Mori et al. | |
| 7,163,153 B2 | 1/2007 | Blossom | |
| 7,503,489 B2 * | 3/2009 | Heffez et al. | 235/382 |
| 7,784,684 B2 | 8/2010 | Labrou et al. | |
| 2001/0053685 A1 | 12/2001 | Mori et al. | |
| 2004/0255136 A1 | 12/2004 | Fadyushin | |
| 2005/0154671 A1 | 7/2005 | Doan et al. | |
| 2005/0199709 A1 * | 9/2005 | Linlor | 235/380 |
| 2006/0016884 A1 | 1/2006 | Block et al. | |
| 2006/0064590 A1 | 3/2006 | Bleumer et al. | |
| 2007/0080211 A1 * | 4/2007 | Chen | 235/380 |
| 2007/0130085 A1 | 6/2007 | Zhu | |

(Continued)

OTHER PUBLICATIONS

Condon, T., "Smart Cards: A Computer in a Card: Recent developments in this technology expand its potential for facility applications," http://www.todaysfacilitymanager.com/tfm_05_04_factech.asp, downloaded 2008, pp. 1-3.

*Primary Examiner* — Tuyen K Vo
(74) *Attorney, Agent, or Firm* — Fish & Richardson P.C.

(57) ABSTRACT

Systems, methods and computer readable media are disclosed for prioritizing tasks associated with a group of first users based on number of times the first users have monitored the status of a task. In addition to the general system, systems, methods and computer readable media for task prioritizing, the tasks may be prioritized based on the number of first users associated with a task, the importance of each first user associated with a task, and the way the task was identified.

19 Claims, 3 Drawing Sheets

(56) References Cited

U.S. PATENT DOCUMENTS

| | | |
|---|---|---|
| 2007/0251997 A1 | 11/2007 | Brown et al. |
| 2007/0278291 A1 | 12/2007 | Rans et al. |
| 2007/0295805 A1 | 12/2007 | Ramachandran |
| 2009/0031407 A1 | 1/2009 | Kuang |
| 2009/0143104 A1 | 6/2009 | Loh et al. |

* cited by examiner

US 8,833,648 B1

DYNAMIC CREDIT CARD SECURITY CODE VIA MOBILE DEVICE

CROSS-REFERENCE

This application a continuation of U.S. patent application Ser. No. 12/101,881, filed Apr. 11, 2008, now U.S. Pat. No. 8,365,988, and is related by subject matter to the subject matter disclosed in the following commonly assigned application, the entirety of which is hereby incorporated by reference herein: U.S. patent application Ser. No. 12/101,875, filed Apr. 11, 2008.

BACKGROUND OF THE INVENTION

The subject matter described herein relates generally, but not exclusively, to credit card security codes. To help place the inventive subject matter described herein in context, we will now explain some of the basic aspects credit card security codes.

In addition to the account number, there are two security codes on a typical credit card: the CVC1 (card verification code 1) or CVV1 (card verification value 1), and the CVC2 or CVV2. The CVC1 is encoded on the magnetic stripe of the card and used for transactions in person. The CVC2 is typically a three- or four-digit sequence printed on the credit card that is not encoded on the magnetic strip. It is often asked for by merchants to secure "card not present" transactions occurring over the Internet, by mail, fax or over the phone.

While the CVC2 offers some additional security to the card, it is typically easy to obtain by anyone with physical access to the card, because it comprises a short sequence of digits, it is printed on the card, and it does not change. It would therefore improve the security of credit cards if those characteristics of the CVC2 could be dynamically modified to enhance the security of a credit card.

There also exists a CVC3, which is not currently in widespread use. The CVC3 is a number that changes with each transaction. However, it is generated by the card, so there is still a security problem when an unauthorized person obtains the card itself, because that person would have access to the CVC3.

SUMMARY OF THE INVENTION

While the term "credit card" is used above and below, and in the attached drawings, the systems, techniques and methods may be applied to any card that contains a CVC2 or CVC2-type security code. Herein, the term "security code" will be used to refer to a CVC2 or CVC2-type security code.

In example embodiments of the present disclosure, a method and system are provided to prevent fraud associated with a credit card through use of a dynamic security code. In illustrative embodiments, each time the user conducts a financial transaction with his or her credit card and the associated security code, a new security code is generated that replaces the prior security code, and is sent to the user via his or her mobile device (e.g., cell phone, hand-held computing device, or other mobile communications device). This new security code is then used to verify the next transaction that the user makes with the credit card and new security code. Various techniques for generating the security code, representing the security code, and securely transferring the security code to the user may be implemented.

The method may include, but does not require, first maintaining a database of user credit card account information and associated dynamic security codes. A first security code associated with an account of a first user is sent to that user via his or her mobile device. When the first user then makes a purchase with his or her credit card that requires use of the security code to be processed, the credit card server processes the transaction. Where the transaction is approved, the credit card server sends a message to that effect to the merchant who is the recipient of the transaction. Then the credit card server updates the first user's security code in the database by replacing the first security code with a second security code, and sends the second security code to the mobile device of the first user.

A system and computer readable medium are also disclosed that perform comparable functions as the method discussed above.

The foregoing is a summary and thus contains, by necessity, simplifications, generalizations and omissions of detail. Those skilled in the art will appreciate that the summary is illustrative only and is not intended to be in any way limiting.

BRIEF DESCRIPTION OF THE DRAWINGS

The systems, methods, and computer readable media for prioritizing tasks associated with a group of users based on the users' interest in each task in accordance with this specification are further described with reference to the accompanying drawings in which.

DETAILED DESCRIPTION OF ILLUSTRATIVE EMBODIMENTS

Figure 1:
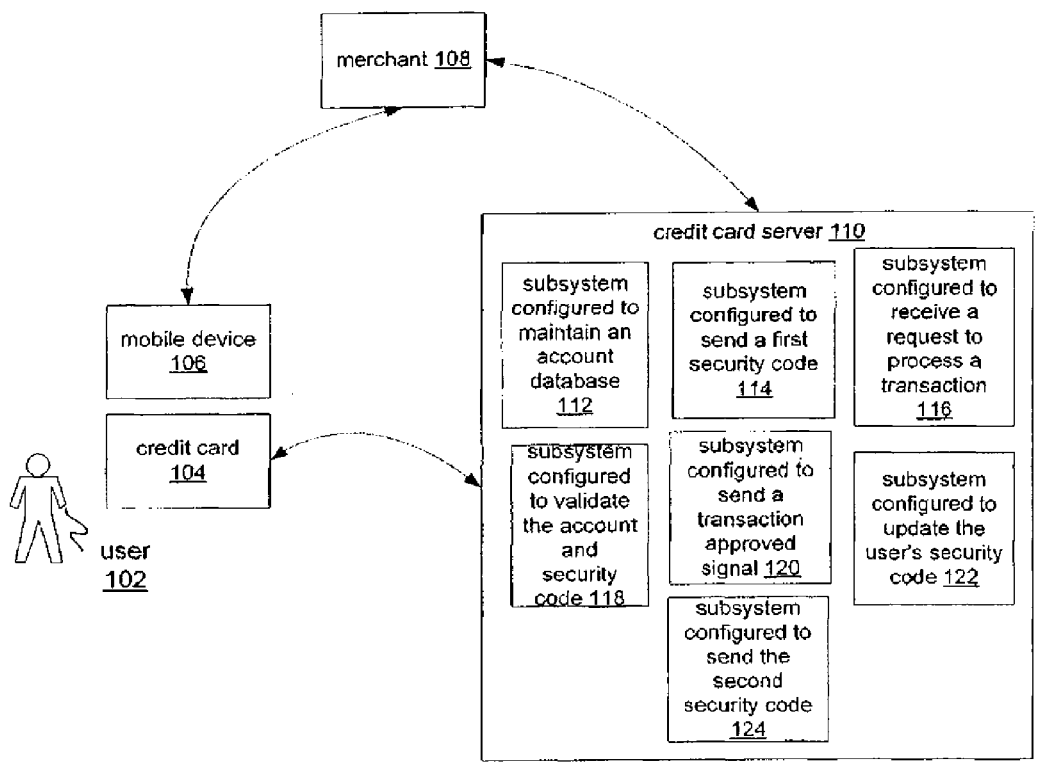
FIG. 1 illustrates an example system for preventing fraud associated with a credit card through use of a dynamic security code.
Figure 2:
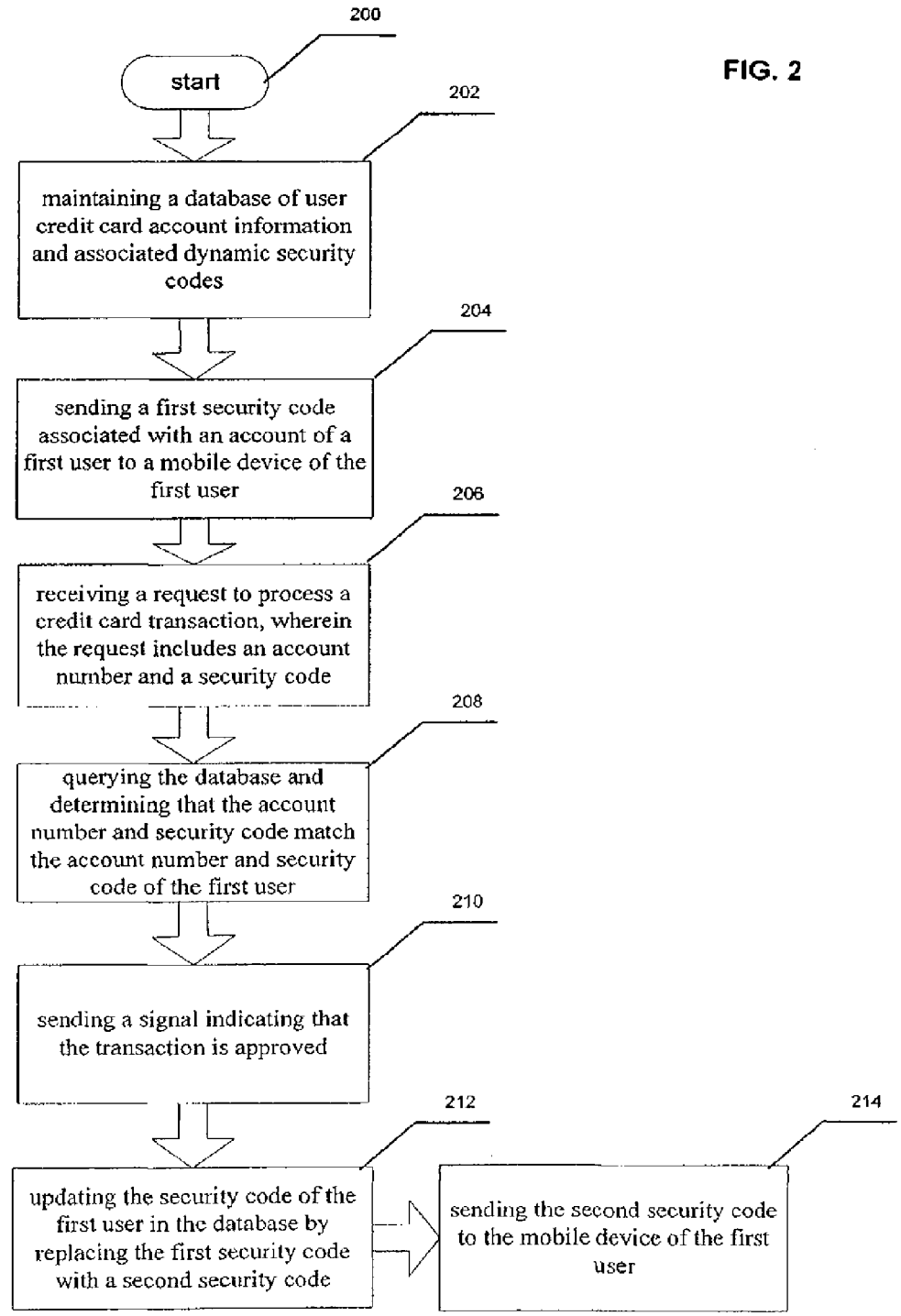
FIG. 2 illustrates an example operational procedure for preventing fraud associated with a credit card through use of a dynamic security code.

Certain specific details are set forth in the following description and figures to provide a thorough understanding of various embodiments. Those of ordinary skill in the relevant art will understand that they can practice other embodiments without one or more of the details described below. While various methods are described with reference to steps and sequences in the following disclosure, the description as such is for providing a clear implementation of embodiments of the invention, and the steps and sequences of steps should not be taken as required. FIG. 1 illustrates an operating environment in which operating procedures may be performed. FIG. 2 depicts example operating procedures.

In addition, while various methods are described with reference to steps and sequences in the following description, the description is intended to describe a clear implementation of embodiments of the invention, and the steps and sequences of steps should not be taken as required to practice this invention. In general, it is contemplated that the various systems, methods, and computer readable media disclosed herein will be implemented within a system for processing credit or charge card transactions. Such a system will generally be described as a "computer-implemented" system that includes "subsystems" for automatically handling card transactions in the manner described below. It should be understood that the various subsystems may be implemented with computer software that is executable by a processor, as described.

FIG. 1 illustrates a computer-based system preventing fraud associated with a credit card through use of a dynamic security code.

A credit card server 110 may comprise a computer-based system comprising at least one subsystem configured to maintain a database of user credit card account information and associated dynamic security codes 112, at least one subsystem configured to send a first security code associated with an account of a first user to a mobile device of the first user 114, at least one subsystem configured to receive a request to process a credit card transaction, wherein the request includes an account number and a security code 116, at least one subsystem configured to query the database and determining that the account number and security code match the account number and security code of the first user 118, at least one subsystem configured to send a signal indicating that the transaction is approved 120, at least one subsystem configured to update the security code of the first user in the database by replacing the first security code with a second security code 122, and at least one subsystem configured to send the second security code to the mobile device of the first user 124.

A user 102 establishes an account with the credit card server 110 and is issued a credit card 104. To establish the account, the account database 112 is populated with the user's account information and a first security code. That security code is issued to the user via the first security code sending subsystem 114. In an embodiment, the user may receive the security code when establishing the credit card account in the same manner in which he receives the security code (for example, printed on paper, via mail in the package that includes the credit card). In an embodiment, the user may receive the first security code via his mobile device 106.

The user 102 then uses his credit card to conduct a financial transaction with a merchant 108. In an embodiment, where the user 102 and the merchant 108 are conducting the transaction in person, the magnetic strip on the credit card 104 would be read by a credit card reader, and the CVC1 security code contained on the magnetic strip would be used. In an embodiment, such a transaction would not trigger the step, but only a transaction involving the CVC2 security code would. In such an embodiment, the user 102 may tell the merchant 108 that security code via telephone, or enter it into a website along with other information, such as the credit card account number, user name and address, and credit card expiration date. The merchant would take this information and send it to the credit card server 110 with a request to process the credit card transaction in question.

That request is received by a subsystem configured to receive credit card transaction requests 116. In an embodiment, this request comprises the user's 102 credit card account number and security code. In an embodiment, this request also comprises, the date, the time, the transaction amount, the user's name, the user's address, the identity of the merchant, and the subject of the transaction.

Once received, a subsystem configured to determine that the account number and security code match the account number and security code of the first user 116 queries the database for the user's account number and security code and verifies that they match the account number and security code of the prospective transaction as submitted by the merchant 108. In an embodiment, this may comprise accessing the database populated by data pairs of user credit card account information and the corresponding security code stored on a computing device for the first user's account number and security code and verifying that they match the account number and security code of the prospective transaction.

Where the transaction is approved, for instance if the account information and security code are validated and the amount of the transaction is within the remaining credit limit that the user's 102 credit card account has, then a subsystem configured to send a signal indicating that the transaction is approved 120 sends a signal indicating that the transaction was approved. In an embodiment where it is the merchant 108 who submitted the request to process a credit card transaction, this may comprise sending a signal via the same medium that the merchant used. For example, if the merchant submitted the request over a communications network, the signal could be sent back over that same communications network. In another embodiment, different mediums could be used. Where the merchant submitted the request via telephone, the signal could be returned to the merchant via an e-mail. In an embodiment where the user 102 submitted the request, this may comprise sending the signal to the user's mobile device 106.

After the signal indicating that the transaction was approved is sent, a subsystem configured to update the security code of the first user 122 updates the security code of the first user in the database by replacing the first security code with a second security code. In an embodiment, the second security code may be generated via a random number generator. In an embodiment, if the second security code is generated and then determined to be equal to the first security code, the second security code may be re-generated, so that the second security code is ensured to be different from the first security code. In an embodiment, once generated satisfactorily, the credit card server may query the database for the user's account information and security code and then replace the first security code that exists in the database with the second security code. In an embodiment, the second security code may be re-generated periodically (such as every minute) according to a predefined logarithmic algorithm. The current second security code would be replaced by the newly generated second security code and the first security code that exists in the database would be replaced with the current second security code upon sending a signal indicating that the transaction was approved.

Once the security code has been updated, a subsystem configured to send the second security code to the mobile device of the first user 124 sends the second security code to the mobile device 106 of the first user 102.

In an embodiment, wherein the credit card contains a wireless communications transponder, the mobile device contains a wireless communications receiver, this may comprise sending the second security code to the mobile device when the mobile device is able to sense the wireless communications transponder of the credit card. The wireless communications transponder and wireless communications receiver may comprise Bluetooth technology.

In an embodiment, wherein the credit card contains a radio frequency identification device, the mobile device contains a radio frequency identification sensor, this may comprise sending the second security code to the mobile device when the mobile device is able to sense the radio frequency identification device of the credit card. The mobile device could communicate this with the credit card server by sending a message indicative of this to the credit card server. If the mobile device and the credit card are out of communication range with each other, that may be indicative that at least one of them is no longer in possession by the user. In that case, it may be prudent to not send the security code so that someone other than the user does not obtain it. In an embodiment, attempts to send the security code would continue until the mobile device and credit card are in appropriate range and the security code is successfully sent.

In another embodiment, only one attempt to send would be made, and if unsuccessful, no further attempts would be made. In that case, the user would need to contact the credit card server via other means to obtain the second security code. For instance, the user may need to call the credit card server and verify his or her identity and credentials over the phone.

In an embodiment, sending the second security code to the mobile device of the first user includes first converting the security code into an alternative representation comprising a series of symbols drawn from at least one of a digit, a letter, a symbol, and a color. The security code is not restricted to digits. It could comprise a short pass-phrase, such as "lamp," a pictorial representation of a lamp, or a series of a few blocks of color, such as red, white, and blue, in that order.

In an embodiment, the mobile device may contain an embedded application, such that the user initiates the application on the mobile device by entering the alternative representation as the key. The application would then transmit a decoded version of the key, where this decoded version is the second security code. In an embodiment, the mobile device may have a list of codes embedded in memory and it requires the correct key to select the right one. In an embodiment, the list of codes may be updated periodically as mobile updates to the application embedded in the phone.

In an embodiment, this further comprises encrypting the second security code before sending the second security code to the mobile device of the user. This may comprise two layers of asymmetrical cryptography, such as via public key encryption. In this example, the user's mobile device would have a private key that it kept and a public key that it broadcast, and the credit card server would have the same. The credit card server would encrypt the security code with its own private key and then with the mobile device's public key, then send the doubly-encrypted message to the mobile device. The mobile device would first decrypt the message with its private key (that corresponds to the mobile device's public key) to obtain the security code encrypted with the credit card server's private key. It would then use the credit card server's public key to decrypt that message and obtain the new security code. Under this technique, only the credit card server could send such a message and only the user's mobile device could decrypt it, thus verifying both parties. Only the credit card server could send such a message because only it has the credit card server's public key. Likewise, only the user's mobile device could decrypt such a message because only it has the mobile device's private key.

In an embodiment, before sending the second security code to the mobile device of the user, the credit card server receives a message from the mobile device indicative of a valid account credential. This may comprise the user inputting a credential into his mobile device to verify that he is exercising dominion over said device. This credential would then be sent to the credit card server for verification. If verified, then the second security code would be sent to the mobile device.

In another embodiment, the second security code is sent to the mobile device of the user, and the user then is required to validate his credentials on the mobile device locally to access it. In an embodiment, this may comprise entering a login and password to unlock the mobile device or view the second security code itself. In another embodiment, this may comprise the user entering a passkey that is used by the mobile device to decrypt the second security code. The device might also be unlocked through the use of a biometric identification from the first user.

FIG. 2 illustrates a method preventing fraud associated with a credit card through use of a dynamic security code. Those skilled in the art will note that operations 200-214 are illustrative in purpose and that different implementations can select appropriate operation(s) for such implementations.

Operation 200 begins the operational process. Operation 200 can be triggered for example in response to opening a new credit card account for a user.

Operation 202 depicts maintaining a database of user credit card account information and associated dynamic security codes. In an embodiment, this may comprise storing, on a computing device a database populated by data pairs of user credit card account information and the corresponding security code.

Operation 204 depicts sending a first security code associated with an account of a first user to a mobile device of the first user. This may comprise sending the user's mobile device a short message service message containing the new security code, calling the user's mobile device with an audio message containing the new security code, or e-mailing the user at the user's device with an e-mail containing the new security code.

In an embodiment, sending the security code to the mobile device of the first user includes first converting the security code into an alternative representation comprising a series of symbols drawn from at least one of a digit, a letter, a symbol, and a color. The security code is not restricted to digits. It could comprise a short pass-phrase, such as "lamp," a pictorial representation of a lamp, or a series of a few blocks of color, such as red, white, and blue, in that order.

In an embodiment, this further comprises encrypting the first security code before sending the first security code to the mobile device of the first user. This may comprise two layers of asymmetrical cryptography, such as via public key encryption. In this example, the user's mobile device would have a private key that it kept and a public key that it broadcast, and the credit card server would have the same. The credit card server would encrypt the security code with its own private key and then with the mobile device's public key, then send the doubly-encrypted message to the mobile device. The mobile device would first decrypt the message with its private key (that corresponds to the mobile device's public key) to obtain the security code encrypted with the credit card server's private key. It would then use the credit card server's public key to decrypt that message and obtain the new security code. Under this technique, only the credit card server could send such a message and only the user's mobile device could decrypt it, thus verifying both parties. Only the credit card server could send such a message because only it has the credit card server's public key. Likewise, only the user's mobile device could decrypt such a message because only it has the mobile device's private key.

Operation 206 depicts receiving a request to process a credit card transaction, wherein the request includes an account number and a security code. In an embodiment, this request is sent by a merchant or other party with whom the user is remotely conducting a financial transaction via his credit card. In an embodiment, where the user and the merchant are conducting the transaction in person, the magnetic strip on the credit card would be read by a credit card reader, and the CVC1 security code contained on the magnetic strip would be used. In an embodiment, such a transaction would not trigger the step, but only a transaction involving the CVC2 security code would. In such an embodiment, the user may tell the merchant that security code via telephone, or enter it into a website along with other information, such as the credit card account number, user name and address, and credit card expiration date. The merchant would take this information and send it to the credit card server with a request to process the credit card transaction in question.

Operation 208 depicts querying the database and determining that the account number and security code match the account number and security code of the first user. This may comprise accessing the database populated by data pairs of user credit card account information and the corresponding security code stored on a computing device for the first user's account number and security code and verifying that they match the account number and security code of the prospective transaction.

Operation 210 depicts sending a signal indicating that the transaction is approved. In an embodiment where a merchant submits a request to process a credit card transaction as in operation 206, this may comprise sending a signal via the same medium that the merchant used. For example, if the merchant submitted the request over a communications network, the signal could be sent back over that same communications network. In another embodiment, different mediums could be used. Where the merchant submitted the request via telephone, the signal could be returned to the merchant via an e-mail.

Operation 212 depicts updating the security code of the first user in the database by replacing the first security code with a second security code. In an embodiment, the second security code may be generated via a random number generator. In an embodiment, if the second security code is generated and then determined to be equal to the first security code, the second security code may be re-generated, so that the second security code is ensured to be different from the first security code. In an embodiment, once generated satisfactorily, the credit card server may query the database for the user's account information and security code and then replace the first security code that exists in the database with the second security code.

Operation 214 depicts sending the second security code to the mobile device of the first user. In an embodiment, wherein the credit card contains a radio frequency identification device, the mobile device contains a radio frequency identification sensor, this may comprise sending the second security code to the mobile device when the mobile device is able to sense the radio frequency identification device of the credit card. The mobile device could communicate this with the credit card server by sending a message indicative of this to the credit card server. If the mobile device and the credit card are out of communication range with each other, that may be indicative that at least one of them is no longer in possession by the user. In that case, it may be prudent to not send the security code so that someone other than the user does not obtain it. In an embodiment, attempts to send the security code would continue until the mobile device and credit card are in appropriate range and the security code is successfully sent. In another embodiment, only one attempt to send would be made, and if unsuccessful, no further attempts would be made. In that case, the user would need to contact the credit card server via other means to obtain the second security code. For instance, the user may need to call the credit card server and verify his or her identity and credentials over the phone.

In an embodiment, sending the second security code to the mobile device of the first user includes first converting the security code into an alternative representation comprising a series of symbols drawn from at least one of a digit, a letter, a symbol, and a color. The security code is not restricted to digits. It could comprise a short pass-phrase, such as "lamp," a pictorial representation of a lamp, or a series of a few blocks of color, such as red, white, and blue, in that order.

In an embodiment, this further comprises encrypting the second security code before sending the second security code to the mobile device of the user. This may comprise two layers of asymmetrical cryptography, such as via public key encryption. In this example, the user's mobile device would have a private key that it kept and a public key that it broadcast, and the credit card server would have the same. The credit card server would encrypt the security code with its own private key and then with the mobile device's public key, then send the doubly-encrypted message to the mobile device. The mobile device would first decrypt the message with its private key (that corresponds to the mobile device's public key) to obtain the security code encrypted with the credit card server's private key. It would then use the credit card server's public key to decrypt that message and obtain the new security code. Under this technique, only the credit card server could send such a message and only the user's mobile device could decrypt it, thus verifying both parties. Only the credit card server could send such a message because only it has the credit card server's public key. Likewise, only the user's mobile device could decrypt such a message because only it has the mobile device's private key.

In an embodiment, before sending the second security code to the mobile device of the user, the credit card server receives a message from the mobile device indicative of a valid account credential. This may comprise the user inputting a credential into his mobile device to verify that he is exercising dominion over said device. This credential would then be sent to the credit card server for verification. If verified, then the second security code would be sent to the mobile device.

In another embodiment, the second security code is sent to the mobile device of the user, and the user then is required to validate his credentials on the mobile device locally to access it. In an embodiment, this may comprise entering a login and password to unlock the mobile device or view the second security code itself. In another embodiment, this may comprise the user entering a passkey that is used by the mobile device to decrypt the second security code.

Figure 3:
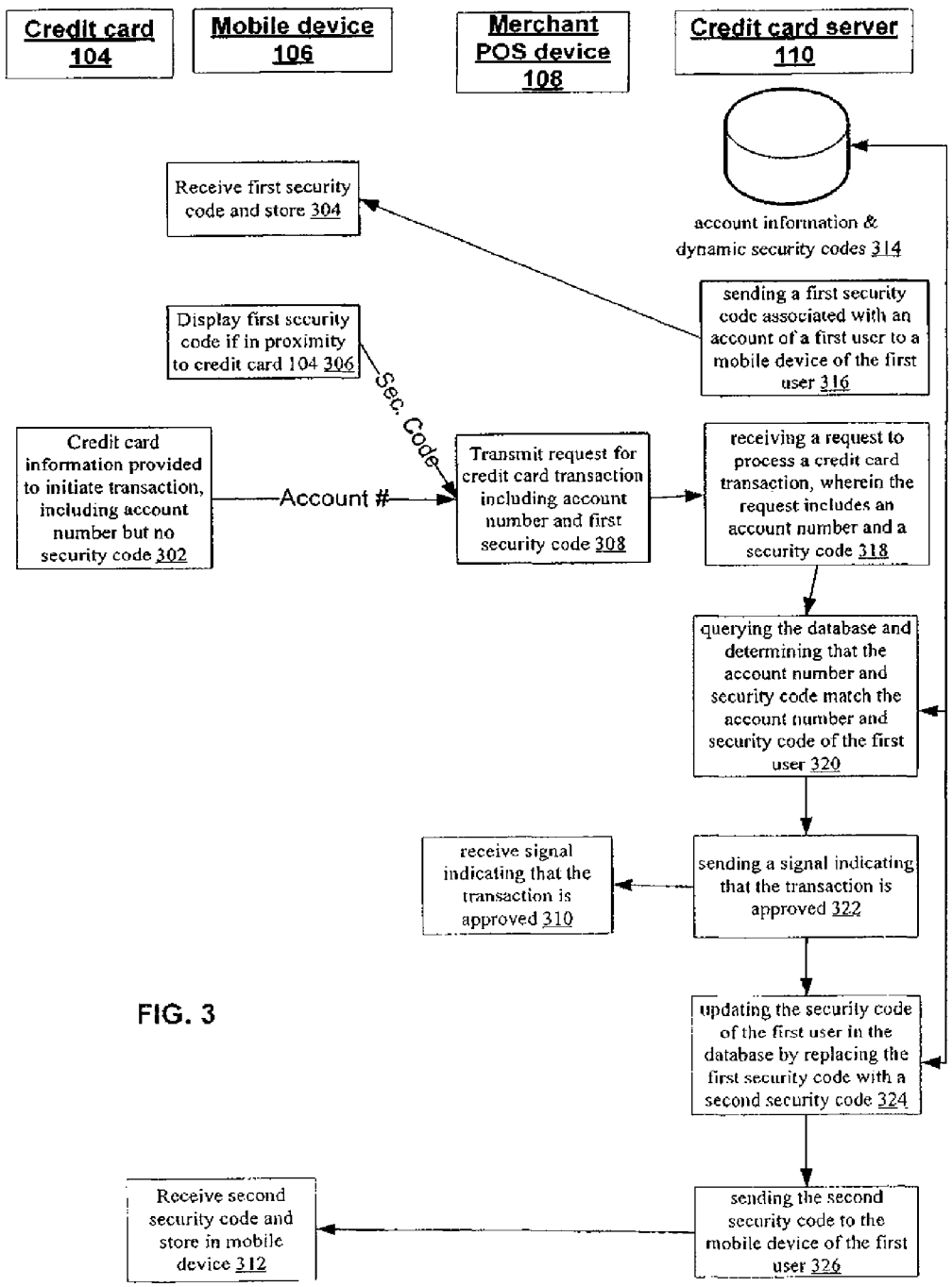
FIG. 3 illustrates an example information flow between various devices used in preventing fraud associated with a credit card through use of a dynamic security code.

FIG. 3 illustrates an information flow for preventing fraud associated with a credit card through use of a dynamic security code. Those skilled in the art will note that operations and elements 302-326 are illustrative in purpose and that different implementations can select appropriate operation(s) for such implementations.

Operation 314 depicts the credit card server 110 sending a first security code that is associated with the account of the first user to the mobile device of the first user. In an embodiment, this first security code is drawn from a database that stores account information and dynamic security codes 314. In another embodiment, this first security code is generated by the credit card server 110 and then both sent to the mobile device of the first user and stored in the database 314. Operation 304 depicts receiving and storing by the first user's mobile device 106, a first security code. Operation 306 depicts displaying that first security code if it is in close proximity to the first user's credit card. In an embodiment, the credit card contains a radio frequency identification chip and the mobile device contains a radio frequency identification sensor. If the mobile device is able to detect the card via that sensor, then it displays the first security code. In another embodiment, this includes displaying the first security code the to merchant's point-of-sale (POS) device 106 in the course of conducting a financial transaction.

Operation 302 depicts providing the credit card information of a first user 102 by that user to initiate a financial transaction. In an embodiment, this credit card information includes an account number but not a security code.

When a financial transaction is initiated by the first user through that merchant's point-of-sale device 106, the first security code and credit card account information are transferred to the merchant's POS device 106. In an embodiment, the POS device 106 comprises a web site and the information is transferred by the first user typing it into text fields in the web site using a computer and then clicking a button to submit the page.

The POS system 106 then transfers that information along with a request to make the purchase to the credit card server 110. The credit card server 110 receives a request to process a credit card transaction, wherein the request includes an account number and a security code 318. In an embodiment, this transfer takes place over a communications network. Operation 320 depicts querying the database and determining that the account number and security code match the account number and security code of the first user. In an embodiment, this comprises a direct comparison of the information received in the request and the information in the database 314 and returning that they match only if they are exactly equal.

Where the information does match, operation 322 depicts sending a signal to the POS system 106 indicating that the transaction is approved 322. In an embodiment, this further comprises validating that the credit limit associated with the first account is greater than or equal to the amount of the transaction. Where the signal indicating that the transaction is approved is sent 322 by the credit card server 110, the POS system 106 receives a signal indicating that the transaction is approved 310.

Where the transaction has been approved, operation 326 depicts sending a second security code to the mobile device of the first user 326 and operation 312 depicts the user's mobile device 104 receiving and storing the second security code. In an embodiment, this second security code is stored in the database 314, replacing the first security code. In an embodiment, the second security code, when received by the user's mobile device 104, becomes valid for making the next transaction, and the first security code becomes invalid for making a transaction.

CONCLUSION

While the present disclosure has been described in connection with the preferred aspects, as illustrated in the various figures, it is understood that other similar aspects may be used or modifications and additions may be made to the described aspects for performing the same function of the present disclosure without deviating there from. Therefore, the present disclosure should not be limited to any single aspect, but rather construed in breadth and scope in accordance with the appended claims. For example, the various procedures described herein may be implemented with hardware or software, or a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium. When the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only.

What is claimed:

1. A method for preventing fraud associated with a credit card, comprising:
   receiving, by a user at a mobile device of the user, a first security code associated with a credit card account of the user;
   displaying the first security code on the mobile device of the user when a wireless communications receiver of the mobile device is able to sense a wireless communications transponder of the credit card;
   initiating, by the user, a credit card transaction using the first security code;
   receiving, by the user's mobile device, a second security code to replace the first security code, from a credit card server associated with the credit card account when the wireless communications receiver of the mobile device is able to sense the wireless communications transponder of the credit card and the mobile device sends confirmation to the credit card server that the mobile device is able to sense the wireless communications transponder.

2. The method of claim 1, wherein receiving the second security code includes validating, by the mobile device, a credential supplied by the user before displaying the second security code.

3. The method of claim 1, including sending confirmation, by the user's mobile device, to the credit card server that the mobile device is able to sense the wireless communications transponder of the credit card before receiving the second security code from the credit card server.

4. The method of claim 1, further including encrypting the second security code at the credit card server and decrypting the second security code with the user's mobile device.

5. The method of claim 1, wherein receiving the security code by the mobile device of the first user includes converting the security code into an alternative representation comprising a series of symbols drawn from at least one of:
   a digit, a letter, a symbol, and a color.

6. The method of claim 1, wherein the second security code is different from the first security code.

7. The method of claim 1, further including displaying the second security code on the mobile device of the user when a wireless communications receiver of the mobile device is able to sense a wireless communications transponder of the credit card.

8. A system, comprising:
   a processor;
   a memory storing computer-readable instructions, the computer-readable instructions executable by the processor to:
      send a first security code associated with an account of a user to a mobile device of the user;
      receive as request to process a credit card transaction, wherein the request includes the first security code;
      determine that the first security code received in the request matches a record of the first security code stored in a database;
      send a signal indicating that the transaction is approved; and
      generate and send a second security code to the mobile device of the user,
   wherein the second security code is sent to the mobile device of the user when a message is received at a server from the mobile device that indicates the mobile device is able to sense a: wireless communications transponder of a card associated with the account of the user.

9. The system of claim 8, wherein the record of the first security code in the database is updated by replacing the first security code with the second security code.

10. The system of claim 8, wherein the second security code sent to the mobile device of the user is encrypted.

11. The system of claim 8, wherein a credential supplied by the user is validated before sending the second security code.

12. The system of claim 8, wherein the second security code is generated on a periodic basis.

13. A non-transitory computer-readable medium having computer executable instructions stored thereon that are executed by a processor to:
   receive a first security code associated with an account of a user at a mobile device of the user;
   send a request from the mobile device of the user to process a credit card transaction, wherein the request includes the first security code;
   receive a confirmation that the credit card transaction was approved; and
   receive a second security code associated with the account of the user for use in a subsequent request to process a subsequent credit card transaction, wherein the second security code is sent to the mobile device of the user when a message is received at a server from the mobile device that indicates the mobile device is able to sense a wireless communications transponder of credit card.

14. The computer readable medium of claim 13, including instructions executed to send a message that indicates the mobile device of the user is able to sense a wireless communications transponder of the credit card.

15. The computer readable medium of claim 14, wherein the mobile device of the user is able to sense the wireless communication transponder of the credit card via Bluetooth communication.

16. The computer readable medium of claim 14, wherein the mobile device of the user is able to sense the wireless communication transponder of the credit card via radio frequency identification device (RFID) communication.

17. The computer readable medium of claim 13, including instructions executed to display the second security code on the mobile device of the user.

18. The computer readable medium of claim 13, including instructions executed to convert the second security code into an alternative representation comprising a series of symbols drawn from at least one of:
   a digit, as letter, a symbol, and a color.

19. The computer readable medium of claim 13, including instructions executed to validate, by the mobile device, a credential supplied by the user before displaying the second security code.

* * * * *

UNITED STATES PATENT AND TRADEMARK OFFICE
CERTIFICATE OF CORRECTION

| | | |
|---|---|---|
| PATENT NO. | : 8,833,648 B1 | Page 1 of 1 |
| APPLICATION NO. | : 13/759470 | |
| DATED | : September 16, 2014 | |
| INVENTOR(S) | : Medina, III et al. | |

It is certified that error appears in the above-identified patent and that said Letters Patent is hereby corrected as shown below:

In the Claims

Column 10, Line 54, Claim 8, delete "as" and insert -- a --

Column 10, Line 66, Claim 8, delete "a:" and insert -- a --

Column 11, Line 26, Claim 13, after "of" insert -- a --

Column 12, Line 20, Claim 18, delete "as" and insert -- a --

Signed and Sealed this

Second Day of December, 2014

Michelle K. Lee
*Deputy Director of the United States Patent and Trademark Office*